(No Model.) 2 Sheets—Sheet 1.
M. M. NEAMES.
SUGAR CONVEYER, ELEVATOR, AND BIN.
No. 590,742. Patented Sept. 28, 1897.
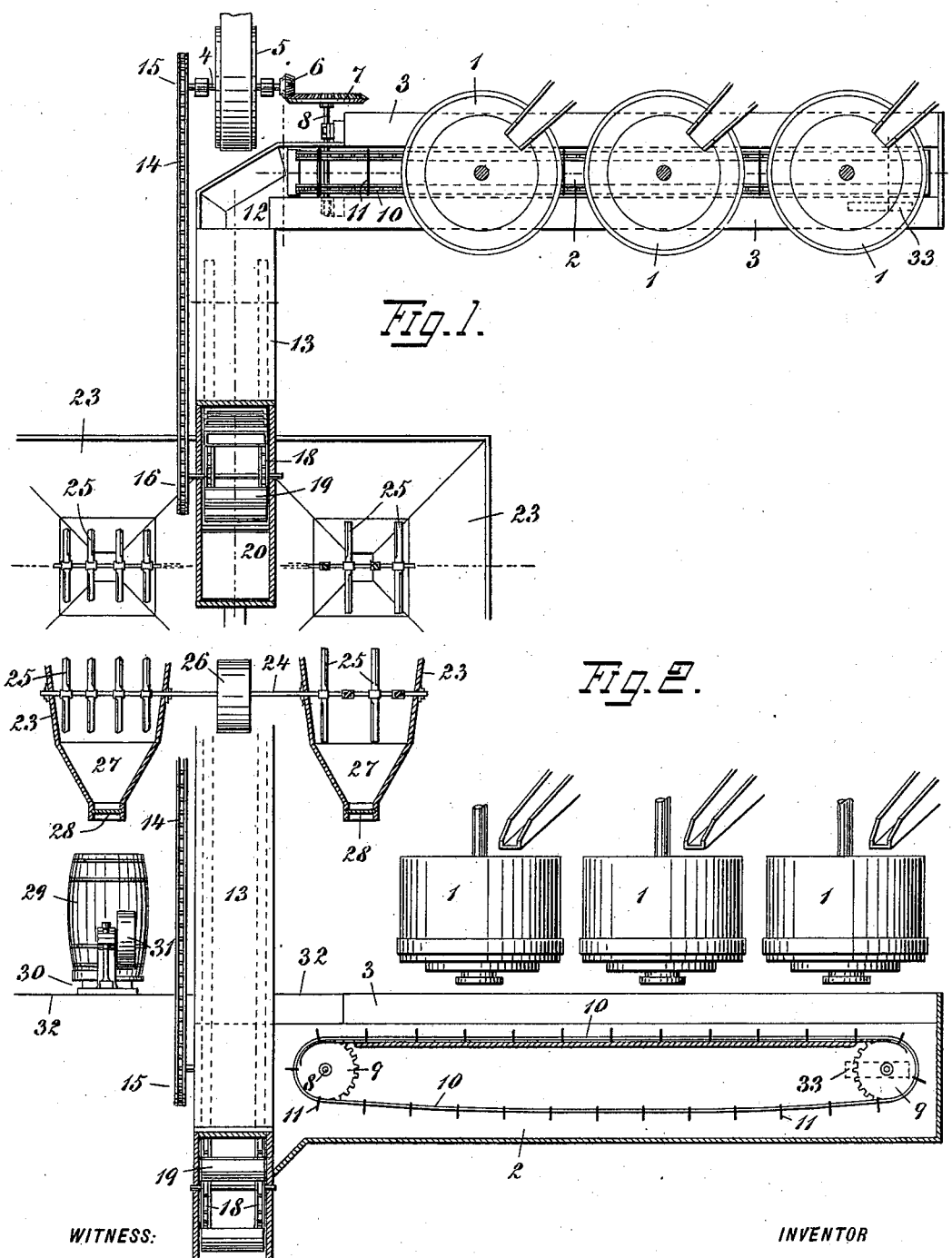
WITNESS:
Henry Graham
J. H. Jochum Jr.
INVENTOR
Maurice M. Neames.
BY
Thomas McCarty
ATTORNEY

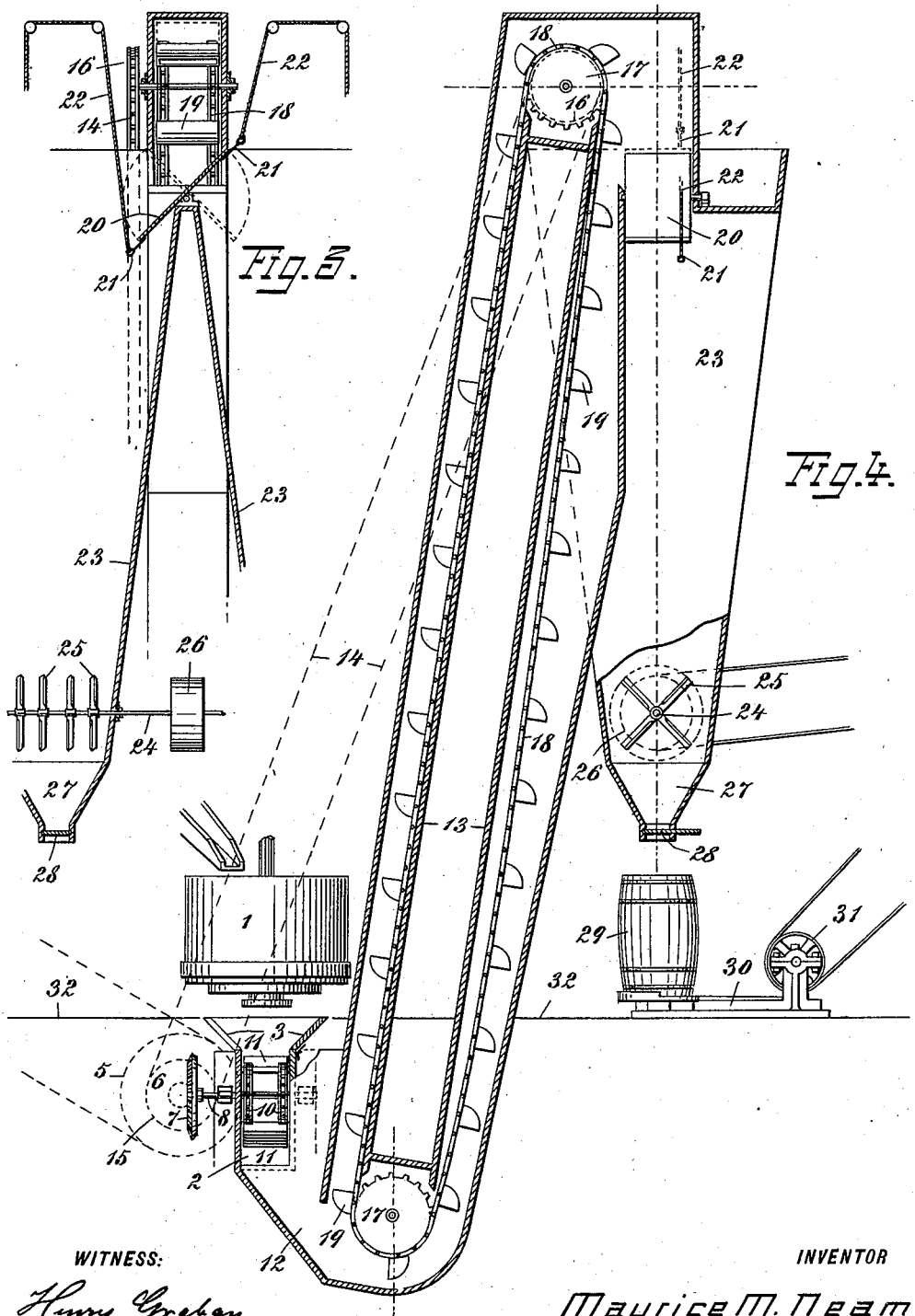

UNITED STATES PATENT OFFICE.

MAURICE M. NEAMES, OF ST. PATRICK, LOUISIANA.

SUGAR CONVEYER, ELEVATOR, AND BIN.

SPECIFICATION forming part of Letters Patent No. 590,742, dated September 28, 1897.

Application filed January 26, 1897. Serial No. 620,846. (No model.)

*To all whom it may concern:*

Be it known that I, MAURICE MITCHELL NEAMES, a citizen of the United States, residing at St. Patrick, in the parish of St. James and State of Louisiana, have invented certain new and useful Improvements in a Sugar Conveyer, Elevator, and Bin; and I do declare the following to be a full, clear, and exact description of the invention, such as will enable others skilled in the art to which it appertains to make and use the same.

My invention relates to an improvement in sugar conveyers, elevators, and bins, and its novelty will be fully understood from the following description and claim when taken in connection with the annexed drawings; and the objects of my invention are to provide means for conveying sugar from the centrifugals in a sugar-house in a continuous and uninterrupted manner to a barrel or other receptacle provided for receiving same. I attain these objects by the mechanism illustrated in the accompanying drawings, in which—

Figure 1 is a top view. Fig. 2 is a front view. Fig. 3 is a vertical section and addition of Fig. 2. Fig. 4 is a vertical cross-section.

Similar numerals refer to similar parts throughout the several views.

In the drawings the numeral 1 designates centrifugals or feeders such as are in ordinary use in a sugar-house.

2 shows frame in which a conveyer travels.

3 designates a hopper into which sugar from centrifugals falls.

4 is a driving-shaft of conveyer in frame 2, and 5 designates a driving-pulley.

6 and 7 are bevel-wheels, the latter being placed on shaft 8, upon which are sprocket-wheels 9, being connected by means of a sprocket-chain 10, upon which are scraper-blades 11, which prevent the accumulation of sugar at any given point and causes the same to be carried into well 12 of elevator.

13 is a housing-frame of elevator, 14 showing a driving-chain of elevator which passes over sprocket-wheels 15 and drives sprocket-wheels 16 and 17, and passing over the latter wheels is a sprocket-chain 18, to which are attached buckets 19. Placed in position, as shown in Figs. 1 and 4—*i. e.*, across the mouth of both chutes 23, so as to open and close the same alternately—is a laterally-tilting receiving-platform 20, upon which the sugar is discharged from elevator, and is provided with eyes 21 for securing ropes or chains 22. By means of said ropes the platform 20 can be thrown at an angle or incline to either side, as shown in Fig. 3, which permits the sugar resting upon platform 20 to be dumped into chutes 23 alternately, said chutes being connected to and communicating with the upper end of the casing or housing 23.

24 designates a shaft upon which are placed agitators 25 and also a pulley 26. These agitators stand just over the chutes 27, the latter being provided with cut-off slides 28.

29 designates a barrel which is removably but firmly held upon a shaker 30, the latter receiving its movement from driving-pulley 31.

32 designates the floor.

33 shows a belt-tightener.

In practice the sugar is discharged from centrifugals or feeders into hopper 3 of conveyer, where it descends into well 12 of elevator, whence it is carried upward by buckets 19 of elevator and falls upon platform 20, and by means of ropes or chains 22 the platform 20 is tipped and the sugar is dumped into chutes 23, where it is agitated and prevented from caking by means of agitators 25, and is finally discharged into barrels or other receptacles through chutes 27.

A striking advantage of my invention is its economical construction and ease by which it may be operated, permitting a continuous discharge of sugar alternately through either bin, avoiding all choking or caking of sugar from its discharge from the centrifugal until it reaches the barrel or other receptacle.

Having described my invention and the manner in which the same is or may be operated, would say in conclusion that I do not limit myself to the precise details shown in illustration, as the same may be varied to some extent; but—

What I claim, and desire to secure by Letters Patent, is—

In a sugar-conveyer substantially as herein described, a series of feeders delivering into a trough, an endless chain within the trough, scraper-blades secured thereto, and means for operating the same; combined with a well communicating with one end of the trough and a casing communicating with the well, an elevator within the casing, a pair of discharge-chutes connected to and communicating with the upper end of the casing, and a tilting platform on which the elevator discharges, said platform being pivoted at its center across the mouth of the chutes, eyes at the opposite ends of the platform, and ropes connected with said eyes for tilting the platform to open and close each chute alternately, agitators in the chutes, and a cut-off slide across the discharge end of the same, as and for the purpose set forth.

In testimony whereof I affix my signature in presence of two witnesses.

MAURICE M. NEAMES.

Witnesses:
WM. WILSON,
D. S. CARR.